(12) United States Patent
Zhou

(10) Patent No.: US 11,898,063 B2
(45) Date of Patent: Feb. 13, 2024

(54) CHEMICAL-MECHANICAL POLISHING SOLUTION

(71) Applicant: Anji Microelectronics (Shanghai) Co., Ltd., Shangai (CN)

(72) Inventor: Wenting Zhou, Shanghai (CN)

(73) Assignee: ANJI MICROELECTRONICS (SHANGHAI) CO., LTD., Shanghai (CN)

( * ) Notice: Subject to any disclaimer, the term of this patent is extended or adjusted under 35 U.S.C. 154(b) by 6 days.

(21) Appl. No.: 16/958,338

(22) PCT Filed: Dec. 26, 2018

(86) PCT No.: PCT/CN2018/124053
§ 371 (c)(1),
(2) Date: Dec. 21, 2020

(87) PCT Pub. No.: WO2019/129106
PCT Pub. Date: Jul. 4, 2019

(65) Prior Publication Data
US 2021/0163786 A1 Jun. 3, 2021

(30) Foreign Application Priority Data
Dec. 27, 2017 (CN) .......................... 201711439535.9

(51) Int. Cl.
*C09G 1/02* (2006.01)
(52) U.S. Cl.
CPC ..................................... *C09G 1/02* (2013.01)
(58) Field of Classification Search
CPC ...................................................... C09G 1/02
See application file for complete search history.

(56) References Cited

U.S. PATENT DOCUMENTS

| 2020/0016721 A1* | 1/2020 | Oouchi | .................... C09G 1/02 |
| 2020/0017716 A1* | 1/2020 | Zhou | ...................... C09K 13/02 |

FOREIGN PATENT DOCUMENTS

| CN | 101457125 | 6/2009 | |
| CN | 102093818 | 6/2011 | |
| CN | 102199399 A | 9/2011 | |
| CN | 102201337 A | 9/2011 | |
| CN | 103131330 A | 6/2013 | |
| CN | 105297025 | 2/2016 | |
| WO | WO-2009107472 A1 * | 9/2009 | ........... C09K 3/1409 |
| WO | WO-2010069149 A1 * | 6/2010 | ................ C23F 3/04 |
| WO | 2012030752 | 3/2012 | |
| WO | 2012083115 | 6/2012 | |

OTHER PUBLICATIONS

International Search Report and Written Opinion dated Mar. 28, 2019 in corresponding International Patent Application No. PCT/CN2018/124053, filed Dec. 26, 2018, 10 pages.

* cited by examiner

Primary Examiner — Allan W. Olsen
(74) Attorney, Agent, or Firm — Dentons US LLP

(57) ABSTRACT

The present invention discloses a chemical mechanical polishing slurry, and the chemical mechanical polishing slurry comprises silica abrasive particles and accelerating agents, wherein the accelerating agents are selected from pyridine compound, piperidine compound, pyrrolidine compound or pyrrole compound and their derivatives, which have one or more carboxyl groups, and pyrimidine compound and its derivatives, which have one or more amino groups. The chemical mechanical polishing slurry can simultaneously increase the removal rate of both silicon nitride and polysilicon.

9 Claims, No Drawings

CHEMICAL-MECHANICAL POLISHING SOLUTION

CROSS-REFERENCE TO PRIOR APPLICATIONS

This application is a National Stage of PCT/CN2018/124053, filed Dec. 26, 2018, and designating the United States (published on Jul. 4, 2019, as WO 2019/129106 A1), which claims priority under 35 U.S.C. § 119 to Chinese Patent Application No. 20171149535.9, filed Dec. 27, 2017, each hereby expressly incorporated by reference in its entirety and each assigned to the assignee hereof.

FIELD OF THE INVENTION

The present invention relates to chemical mechanical polishing slurry field, and more particularly to the chemical mechanical polishing slurry used for silicon nitride and polysilicon.

BACKGROUND OF THE INVENTION

During the manufacturing process of the integrated circuits, silicon nitride material is often used as a barrier layer or etching stop layer to protect the structure of the lower layer. Therefore, during the manufacturing process of semiconductor devices, the step of removing silicon nitride-layer is required at almost every stage, for example, in the step of forming separation structure, the silicon nitride as a barrier layer is required to be removed. However, different removal rate of silicon nitride is required in different stages of the semiconductor manufacturing technologies.

In the case of using the silicon nitride material as the barrier layer, generally, the polishing is required to remove other materials above the barrier layer at first and then stop on the barrier layer. Therefore, most of the polishing slurry is strived to reduce its silicon nitride removal rate, and get a relatively higher removal rate of other materials. For example, in the Shallow Trench Isolation (STI) technology, which uses silicon nitride as the stop layer, the CMP polishing slurry is required to have a higher silicon dioxide removal rate and a lower silicon nitride removal rate. However, in Poly Open Process (POP), a high silicon nitride removal rate and a low polysilicon removal rate are required.

For example, patent CN102199399A discloses a silicon nitride polishing slurry which comprises of water, abrasive and alkyl aryl polyether sulfonic acid compounds, the removal rate selectivity of silicon oxide to polysilicon of the polishing slurry is >5:1, and the removal rate selectivity of silicon nitride to polysilicon is also >5:1; CN102201337A discloses a polishing slurry comprising water, abrasives and acyclic organic sulfonic acid compounds, the removal rate selectivity of silicon oxide to polysilicon is >2:1, and the removal rate selectivity of silicon nitride to polysilicon is also >2:1.

However, with the development of semiconductor manufacturing technology, some of the emerging semiconductor technologies require non-selective polishing slurry, which has a high removal rate of silicon nitride and polysilicon. In the market, this kind of polishing slurry is still relatively scarce.

SUMMARY OF THE INVENTION

In order to solve the above problem, the present invention provides an acid chemical mechanical polishing slurry containing low concentration abrasive particles, one or more compounds selected from pyridine compound, piperidine compound, pyrrolidine compound or pyrrole compound and their derivatives, which have one or more carboxyl groups, and pyrimidine compound having one or more amino groups, the invention significantly improves the removal rate of silicon nitride and polysilicon. The present invention provides a chemical mechanical polishing slurry, it comprises silica abrasive particles and accelerating agents; wherein the accelerating agents are selected from pyridine compound, piperidine compound, pyrrolidine compound or pyrrole compound and their derivatives, which have one or more carboxyl groups, and pyrimidine compound and its derivatives, which have one or more amino groups. Preferably, the mass percent concentration of the silica particles is 1-15%, more preferably is 1%-10%.

Preferably, the pyridine compound, piperidine compound, pyrrolidine compound or pyrrole compound and their derivatives, which have one or more carboxyl groups, are selected from one or more of 2-carboxyl pyridine, 3-carboxyl pyridine, 4-carboxyl pyridine, 2,3-dicarboxyl pyridine, 2,4-dicarboxyl pyridine, 2,6-dicarboxyl pyridine, 3,5-dicarboxyl pyridine, 2-carboxyl piperidine, 3-carboxyl piperidine, 4-carboxyl piperidine, 2,3-dicarboxyl piperidine, 2,4-dicarboxyl piperidine, 2,6-dicarboxyl piperidine, 3,5-dicarboxyl piperidine, 2-carboxyl pyrrolidine, 3-carboxyl pyrrolidine, 2,4-dicarboxyl pyrrolidine, 2,5-dicarboxyl pyrrolidine, 2-carboxyl pyrrole, 3-carboxyl pyrrole, 2,5-dicarboxyl pyrrole and 3,4-dicarboxyl pyridine. Preferably, the mass percent concentration of the pyridine compound, piperidine compound, pyrrolidine compound or pyrrole compound and their derivatives, which have one or more carboxyl groups, is 0.01-1%, more preferably is 0.05-0.6%. Preferably, the pyrimidine compound and its derivatives are selected from one or more of 2-aminopyrimidine, 4-aminopyrimidine, 2,4-diaminopyrimidine, 2,4,5-triaminopyrimidine and their derivatives.

Preferably, the mass percent concentration of the pyrimidine compound and its derivatives, which have one or more amino groups, is 0.01-1%, more preferably is 0.02%-0.6%.

Preferably, the pH value of the chemical mechanical polishing slurry is 2-6.

Preferably, the chemical mechanical polishing slurry further comprises a pH controlling agent and/or a bactericide.

Preferably, the pH controlling agent is selected from one or more of $HNO_3$, $KOH$, $H_3PO_4$, $K_2HPO_4$ and $KH_2PO_4$.

Preferably, the bactericide is selected from one or more of 5-chloro-2-methyl-4-isothiazolin-3-ketone (CIT), 2-methyl-4-isothiazolinone (MIT), 1,2-phenylprothiazolinone (BIT), iodo-propynyl-carbamate (IPBC), 1,3-dihydroxymethyl-5,5-methyl-hydantoin (DMDMH).

Compared with the prior technology, the technical advantages of the present invention are as follows:
1) The present invention provides an acid chemical mechanical polishing slurry;
2) The present invention simultaneously increases the removal rate of both silicon nitride and polysilicon.

DETAILED DESCRIPTION OF THE PREFERRED EXAMPLES

The present invention is further described in the way of examples, but the present invention is not limited to the scope of the examples.

The chemical mechanical polishing slurry according to the formulation of Table 1 is experimented according to the following experimental conditions.

Specific polishing conditions: polisher: LK, pad: IC1010, rotation speed: 93/87 rpm, polishing pressure: 3.0 psi, polishing flow rate: 300 ml/min. To input the above parameters into the LK Polisher, 12" silicon nitride and polysilicon wafers are polished for 1 min, and then cleaned, dried and measured to get the polishing results.

TABLE 1 the formula and the polishing results of the comparative examples 1-2 and the examples 1-8

| polishing slurry | abrasive particle | | carboxyl compound | | pyrimidine compound |
|---|---|---|---|---|---|
| | name | concentration (%) | name | concentration (%) | name |
| comparative example 1 | SiO$_2$ | 2 | | | |
| comparative example 2 | SiO$_2$ | 2 | 2-carboxypyridine | 0.2 | |
| Example 1 | SiO$_2$ | 1 | 2-carboxypyridine | 0.01 | 2-aminopyrimidine |
| Example 2 | SiO$_2$ | 2 | 2,6-dicarboxypyridine | 0.05 | 4-aminopyrimidine |
| Example 3 | SiO$_2$ | 5 | 3-carboxyl-piperidine | 0.1 | 2,4-diaminopyrimidine |
| Example 4 | SiO$_2$ | 7 | 2,4-dicarboxyl-piperidine | 0.3 | 2,4,5-triaminopyrimidine |
| Example 5 | SiO$_2$ | 8 | 2-carboxyl-pyrrolidine | 0.6 | 2-aminopyrimidine |
| Example 6 | SiO$_2$ | 10 | 2,5-dicarboxyl-pyrrolidine | 0.8 | 2-aminopyrimidine |
| Example 7 | SiO$_2$ | 12 | 2-carboxyl-pyrrole | 1 | 2-aminopyrimidine |
| Example 8 | SiO$_2$ | 15 | 2,5-dicarboxyl-pyrrolidine | 0.2 | 2-aminopyrimidine |

| polishing slurry | pyrimidine compound concentration (%) | pH | removal rate of Silicon Nitride (Å/min) | removal rate of Polysilicon (Å/min) |
|---|---|---|---|---|
| comparative example 1 | | 5.0 | 94 | 452 |
| comparative example 2 | | 5.0 | 1050 | 461 |
| Example 1 | 1 | 5.0 | 643 | 1352 |
| Example 2 | 0.1 | 2.0 | 925 | 1687 |
| Example 3 | 0.02 | 3.1 | 1523 | 2216 |
| Example 4 | 0.01 | 4.5 | 1756 | 2649 |
| Example 5 | 0.6 | 3.4 | 1821 | 2452 |
| Example 6 | 0.3 | 5.2 | 2357 | 2766 |
| Example 7 | 0.2 | 2.8 | 1638 | 2389 |
| Example 8 | 0.2 | 6.0 | 1849 | 2853 |

The polishing results of the comparative example 1 and 2 in Table 1 reveal that the addition of pyridine compound, piperidine compound, pyrrolidine compound or pyrrole compound, which have carboxyl groups, greatly increases the removal rate of silicon nitride. The polishing results of the comparative example 2 and examples 1-8 reveal that the addition of pyrimidine compound significantly increases the removal rate of polysilicon. Compared with the comparative example 1 and 2, examples 1-8 reveal that the polishing slurry can concurrently increase the removal rate of silicon nitride and polysilicon by adding carboxyl compounds and pyrimidine compounds at pH 2-6.

It should be noted that the examples of the present invention are of good operability, but not for constituting any limitation to the protection scope thereof. Any person skilled in the art can make alterations or modifications to the examples by the aforementioned technical contents, to form an equivalent and effective example. Any amendments, equivalent changes and modifications to the above-mentioned examples based on the technical essence of the present invention, without departing from the technical solutions of the present invention, shall belong to the scope defined by the technical solutions of the present invention.

What is claimed is:

1. A chemical mechanical polishing slurry, characterized in that the chemical-mechanical polishing slurry consists of silica abrasive particles, first and second accelerating agents, and water;
   wherein the first accelerating agent is a carboxyl-group-containing compound selected from a pyridine compound, a piperidine compound, a pyrrolidine compound, a pyrrole compound, and derivatives thereof, and wherein each of the carboxyl-group-containing compounds includes one or more carboxyl groups;
   wherein the second accelerating agent is a pyrimidine compound containing one or more amino groups, and wherein pH value of the chemical mechanical polishing slurry is 2-6.

2. The chemical mechanical polishing slurry according to claim 1, wherein the mass percent concentration of the silica particles is 1~15%.

3. The chemical mechanical polishing slurry according to claim 2, wherein the mass percent concentration of the silica particles is 1~10%.

4. The chemical mechanical polishing slurry according to claim 1, wherein the first accelerating agent is one or more carboxyl-group-containing compounds selected from 2-carboxyl pyridine, 3-carboxyl pyridine, 4-carboxyl pyridine, 2,3-dicarboxyl pyridine, 2,4-dicarboxyl pyridine, 2,6-dicarboxyl pyridine, 3,5-dicarboxyl pyridine, 2-carboxyl piperidine, 3-carboxyl piperidine, 4-carboxyl piperidine, 2,3-dicarboxyl piperidine, 2,4-dicarboxyl piperidine, 2,6-dicarboxyl piperidine, 3,5-dicarboxyl piperidine, 2-carboxyl pyrrolidine, 3-carboxyl pyrrolidine, 2,4-dicarboxyl pyrrolidine, 2,5-dicarboxyl pyrrolidine, 2-carboxyl pyrrole, 3-carboxyl pyrrole, 2,5-dicarboxyl pyrrole and 3,4-dicarboxyl pyridine.

5. The chemical mechanical polishing slurry according to claim 4, wherein the mass percent concentration of the first accelerating agent is 0.01~1%.

6. The chemical mechanical polishing slurry according to claim 5, wherein the mass percent concentration of the first accelerating agent is 0.05~0.6%.

7. The chemical mechanical polishing slurry according to claim 1, wherein the second accelerating agent is one or more selected from 2-aminopyrimidine, 4-aminopyrimidine, 2,4-diaminopyrimidine, 2,4,5-triaminopyrimidine and derivatives thereof.

8. The chemical mechanical polishing slurry according to claim 7, wherein the mass percent concentration of the second accelerating agent is 0.01~1%.

9. The chemical mechanical polishing slurry according to claim 8, wherein the mass percent concentration of the second accelerating agent is 0.02%~0.6%.

\* \* \* \* \*